March 31, 1931. H. J. PLOURDE 1,798,492
RETARDING AND MIXING APPARATUS FOR INTERNAL COMBUSTION ENGINES
Filed April 11, 1927
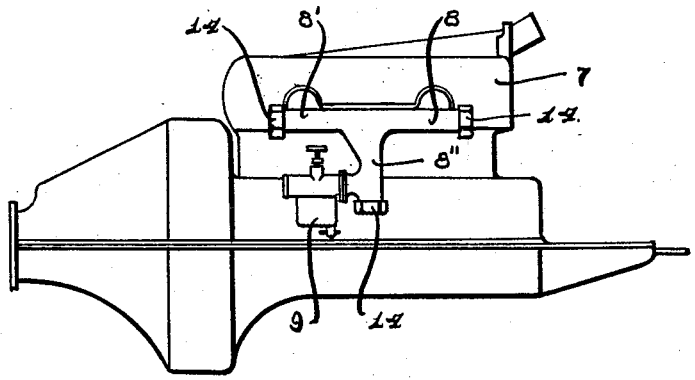
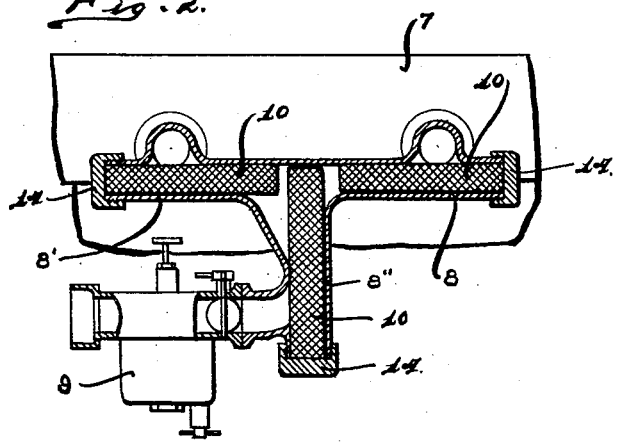
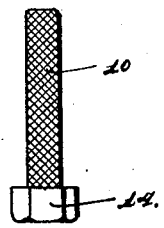
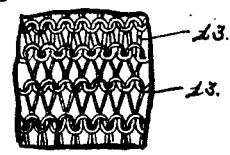
INVENTOR.
Harvey J. Plourde.
BY
ATTORNEY Patented Mar. 31, 1931

1,798,492

UNITED STATES PATENT OFFICE

HARVEY J. PLOURDE, OF RIVER ROUGE, MICHIGAN

RETARDING AND MIXING APPARATUS FOR INTERNAL-COMBUSTION ENGINES

Application filed April 11, 1927. Serial No. 182,613.

My invention relates to a new and useful improvement in a retarding and mixing apparatus for internal combustion engines, and has for its object the provision of a device whereby the fuel delivered to an internal combustion engine may be thoroughly mixed with the air so that a mixture of desired proportions may be had, the fuel and air being homogeneously mixed.

Another object of the invention is the provision of a device which may be easily and quickly mounted in the intake manifold of an engine, particularly of the Ford type, for effecting the retarding and mixing of the incoming gases.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of an engine showing the invention applied.

Fig. 2 is a sectional view through the intake manifold of the engine illustrating the invention applied.

Fig. 3 is a side elevational view of one of the inserting units used in the invention.

Fig. 4 is an enlarged fragmentary view of the material from which the mixing units are made.

Fig. 5 is a detail view of metal strips 13 forming the screen shown in Fig. 4.

In the drawings I have shown the engine 7 equipped with a carburetor 9 having an intake manifold comprising the branches 8 and 8' and the conduit 8'' leading to the branches 8 and 8'. As clearly appears in Fig. 3 the end of the branch 8 is exteriorly threaded, as is likewise the end of the branch 8'. The lower end of the conduit 8'' is also exteriorly threaded. Insertable into the branches 8 and 8' and the conduit 8'' is a unit comprising a body 10 upon which is mounted the cap 14 interiorly threaded. This unit 10 is preferably made from a fine mesh of closely woven wire so that the gases proceeding in the direction of the engine from the carburetor 9 will be slightly retarded and diffused throughout the entire area of the units 10, thus retarding and mixing the fuel with the air so that a thorough mixing of the fuel and air may be had.

As shown in Fig. 4 I have discovered that a very satisfactory material for forming the units 10 comprises a plurality of strips of metal 13 formed into loops and interlaced to form a screen of a large mesh, these strips being preferably formed from copper or the like. The unit is made up from a number of superimposed layers of this material so that none of the openings in the screenlike material are in registration, thus forming a practically infinite number of partitions or baffles which serve to engage, retard and deflect the gases out of their normal path of travel. The gases passing through this material are thoroughly mixed and when the engine is started the branches 8 and 8' and the conduit 8'' are well filled with a thoroughly mixed gas.

Experience has shown that the efficiency of the motor is considerably increased with a device of this kind as it permits a ready supply of gases to the motor in a thoroughly mixed condition, retaining an ample supply of the gas in the passages 8 and 8'.

In this way the operation of the engine is somewhat different from the operation under normal conditions, as the passages 8 and 8' are with greater difficulty exhausted of the mixture therein.

By forming the units in the manner indicated they may be very easily and quickly inserted into the engine and removed therefrom, as desired.

The units may therefore be said to be porous to the gases or foraminous to permit the passage of the gases therethrough and effect their retarding and mixing. The units, while being provided with openings for the passage of the gas therethrough, are not provided with uninterrupted passages.

While I have illustrated and described the preferred form of my invention, I do not wish to limit myself to the precise details of structure shown, but desire to avail myself of such variations and modifications as come within the scope of the appended claim.

Having thus described my invention what I claim as new and desire to secure by Letters Patent is:

A device of the class described adapted for use with an internal combustion engine comprising an intake manifold provided with a threaded open end; a cap for threading on said end and closing the same; an elongated foraminous member projecting inwardly from the inner surface of said cap and substantially filling the portion of the intake manifold into which it projects.

In testimony whereof I have signed the foregoing specification.

HARVEY J. PLOURDE.